(12) United States Patent
Unrau

(10) Patent No.: US 12,552,294 B2
(45) Date of Patent: Feb. 17, 2026

(54) MOTOR VEHICLE SEAT

(71) Applicant: Faurecia Autositze GmbH, Hannover (DE)

(72) Inventor: Dimitri Unrau, Niedernwöhren (DE)

(73) Assignee: Faurecia Autositze GmbH, Hannover (DE)

( * ) Notice: Subject to any disclaimer, the term of this patent is extended or adjusted under 35 U.S.C. 154(b) by 352 days.

(21) Appl. No.: 18/208,397

(22) Filed: Jun. 12, 2023

(65) Prior Publication Data

US 2023/0398910 A1   Dec. 14, 2023

(30) Foreign Application Priority Data

Jun. 13, 2022   (DE) .................... 10 2022 114 760.6

(51) Int. Cl.
   *B60N 2/16*   (2006.01)
   *B60N 2/22*   (2006.01)

(52) U.S. Cl.
   CPC ......... *B60N 2/1615* (2013.01); *B60N 2/2213* (2013.01)

(58) Field of Classification Search
   CPC ... B60N 2/1615; B60N 2/2213; B60N 2/1814
   See application file for complete search history.

(56) References Cited

U.S. PATENT DOCUMENTS

| | | | |
|---|---|---|---|
| 4,713,986 A | 12/1987 | Cremer | |
| 7,093,901 B2* | 8/2006 | Yamada | B60N 2/22 297/367 R |
| 11,214,180 B1 | 1/2022 | Targhi | |
| 2015/0091358 A1* | 4/2015 | Hattori | B60N 2/682 297/452.2 |
| 2018/0099583 A1 | 4/2018 | Yagi | |
| 2018/0236903 A1* | 8/2018 | Chatwin | B60N 2/3056 |
| 2019/0143851 A1* | 5/2019 | Handigol | B60N 2/20 297/341 |
| 2019/0152352 A1* | 5/2019 | Handigol | B60N 2/12 |
| 2022/0396180 A1 | 12/2022 | Qian | |

FOREIGN PATENT DOCUMENTS

| | | |
|---|---|---|
| CN | 215 097 153 U | 12/2021 |
| DE | 35 29 887 A1 | 3/1987 |
| DE | 10 2011 100 148 A1 | 2/2012 |
| DE | 20 2020 107 166 U1 | 1/2021 |

(Continued)

*Primary Examiner* — David R Dunn
*Assistant Examiner* — Jessica Kathryn Thompson
(74) *Attorney, Agent, or Firm* — The Sladkus Law Group

(57) ABSTRACT

The invention relates to a motor vehicle seat (1) having a seat cushion frame (3) which has seat cushion frame side members (5) and is supported by a four-element linkage with front and rear coupling linkages (9) at a height H relative to a floor, and with a backrest frame (4) which has backrest frame side members (6). A change in the height H of the seat cushion frame (3) is possible via a seat height adjustment device. By means of a backrest inclination adjustment device (17), a change in the inclination of the backrest frame (4) can be effected. A connecting tube (25) connects the two seat cushion frame side members (5) to one another. The connecting tube (25) is also connected to the rear coupling linkages (9). The adjustment axis runs through the cross-section of the connecting tube (25).

18 Claims, 14 Drawing Sheets

(56) References Cited

FOREIGN PATENT DOCUMENTS

| | | |
|---|---|---|
| DE | 10 2020 114 396 A1 | 12/2021 |
| DE | 10 2020 122 541 A1 | 3/2022 |
| DE | 20 2022 103 376 U1 | 6/2022 |
| EP | 3 915 829 B1 | 11/2022 |
| GB | 2 541 924 A | 9/2015 |
| KR | 10 2021 0 067 583 A | 6/2021 |
| WO | 2021/036222 A1 | 3/2021 |

\* cited by examiner

MOTOR VEHICLE SEAT

CROSS REFERENCE TO RELATED APPLICATIONS

This application claims priority to co-pending German Patent Application No. DE 10 2022 114 760.6 filed Jun. 13, 2022.

FIELD OF THE INVENTION

The invention relates to a motor vehicle seat, and in particular to a support structure of the same with a seat cushion frame, a backrest frame, and a backrest inclination adjustment device as well as a seat height adjustment device.

BACKGROUND OF THE INVENTION

Support structures of motor vehicle seats are known, for example from the publications U.S. Pat. No. 11,214,180 B1 and KR 10 2021 0 067583 A.

Further prior art is known from DE 10 2020 114 396 A1, DE 10 2020 122 541 A1, DE 20 2020 107 166 U1, GB 2 541 924 A, US 2018/0 099 583 A1, WO 2021/036 222 A1 and CN 215 097 153 U.

SUMMARY OF THE INVENTION

The motor vehicle seat according to the invention has a seat cushion frame and a backrest frame. The seat cushion frame has seat cushion frame side members. The seat cushion frame, in particular the seat cushion frame side members, is/are supported by a four-element linkage with front and rear coupling linkages at a height H relative to a floor, in particular a longitudinal rail supported on the floor. The backrest frame has backrest frame side members.

The present invention in particular proposes a motor vehicle seat, in particular a support structure of the same, which is improved e.g. with regard to
  a compact design and/or
  the space under the vehicle seat for accommodating the forefeet of a person sitting behind the motor vehicle seat and/or
  the packaging and/or
  the kinematics and/or
  the force absorption and distribution.

Furthermore, a seat height adjustment device is present in the motor vehicle seat according to the invention, by means of which a change in the height H of the seat cushion frame is possible (manually or by electric motor), wherein the change in height can also be accompanied by a change in the inclination of the seat cushion frame. Moreover, the motor vehicle seat has a (manual or electric motor-driven) backrest inclination adjustment device, by means of which a change of the inclination of the backrest frame relative to the seat cushion frame takes place about an adjustment axis.

The motor vehicle seat according to the invention has a connecting tube which connects the two seat cushion frame side members to one another. The connecting tube is furthermore connected to the coupling linkages. It is thereby possible that the connecting tube is fastened to the coupling linkages without any degree of freedom remaining, wherein the connecting tube is then preferably borne so as to be rotatable relative to the two seat cushion frame side members. Alternatively, it is possible that the connecting tube is fastened to the seat cushion frame side members without a degree of freedom, while the connection of the connecting tube to the coupling linkages can then take place via a degree of rotational freedom.

The invention proposes that the adjustment axis of the backrest inclination adjustment device extends through the cross-section of the connecting tube. The connecting tube can thereby have an arbitrary hollow cross-section, wherein in this instance the adjustment axis can run through the interior of the connecting tube.

The invention is based on the realization that, for embodiments known from the prior art, the seat cushion frame side members were fixedly connected to one another in the rear end region via a connecting tube, and extensions of the seat cushion frame side members extend upward from the connecting tube at least with one component. The backrest inclination adjustment devices and the adjustment axis thereof are then arranged in the region of these extensions (at a distance from the connecting tube). This known embodiment results in several limitations. For example, for the known embodiments, under the circumstances it is absolutely necessary that the backrest and a cushion of the same begin at a greater height, which can be disadvantageous for the formation of a gap between the seat cushion and the backrest and/or a comfortable reclining surface in the event that the backrest is adjusted into a reclining position in which the backrest is arranged almost in a plane with the seat cushion. Furthermore, this embodiment leads to a large installation space in the rear end region of the motor vehicle seat, since on the one hand the connecting tube and the associated sub-sections of the seat cushion frame, and on the other hand the backrest inclination adjustment device, are formed separately from one another and must be arranged on top of one another. This is disadvantageous, for example, when a compact motor vehicle seat is to be achieved in the rear end region of the seat cushion frame and in the transition region to the backrest frame, as well as in the region of the backrest inclination adjustment device. The installation space required for this embodiment also restricts the free space on the rear side of the motor vehicle seat, between the underside of the seat cushion frame and the floor, which free space is, however, necessary or can be advantageous for accommodating the forefeet of the person sitting on a rear seat behind the motor vehicle seat. Due to the fact that, according to the invention, the adjustment axis of the backrest inclination adjustment device travels through the cross-section of the connecting tube, a compact installation space can be achieved with good packaging.

Within the scope of the invention, the backrest inclination adjustment device can have a right-hand backrest inclination adjustment unit and a left-hand backrest inclination adjustment unit, wherein these can in each instance have a separate manual or electrical actuating drive and/or can have identical or different functional scopes. For one proposal of the invention, the right-hand backrest inclination adjustment unit and the left-hand backrest inclination adjustment unit can be coupled to one another via a coupling rod. On the one hand, the coupling rod can serve to ensure a rigid support of the backrest when at least one backrest inclination adjustment unit is locked, given which the two backrest inclination adjustment units can together secure the same angle of inclination via the coupling rod. On the other hand, the coupling rod serves to ensure that, in the event of a manual or electrical adjustment of only one backrest inclination adjustment unit or of both backrest inclination adjustment units, the inclination angles of the two backrest inclination adjustment units are and remain the same.

According to a proposal according to the invention, the coupling rod can extend through the connecting tube, which likewise leads to a compact design with good packaging. Moreover, the connecting tube can ensure a certain protective function for the coupling rod extending through it.

Within the scope of the invention, it is entirely possible that the adjustment axis and/or the coupling rod extends through the connecting tube, centrally and coaxially with respect to a longitudinal axis or axis of symmetry of said connecting tube. For a special proposal of the invention, the adjustment axis and/or the coupling rod extend(s) through the connecting tube with an offset with respect to the longitudinal axis or axis of symmetry. In this way, a further improved utilization of the tight existing installation space can be effected. If, for example, the adjustment axis and/or the coupling rod is displaced with an offset in the horizontal direction that is forward in relation to the longitudinal axis or axis of symmetry of the connecting tube, it can be avoided that a backrest inclination adjustment device of relatively large design extends beyond the rear side of the motor vehicle seat, and here in particular beyond the backrest. If the adjustment axis and/or the coupling rod is arranged with an offset in the vertical direction that is downward in relation to the longitudinal axis or axis of symmetry of the connecting tube, a further downward displacement of the backrest and the backrest frame can hereby be effected. Under the circumstances, both of the aforementioned types of offset may also contribute to a manual actuation element of the backrest tilt adjustment device being better accessible to the user. It is understood that the offset can have two different offset components, namely an offset component in the horizontal direction (preferably forward) and an offset component in the vertical direction (preferably downward).

For a motor vehicle seat according to the invention, it is proposed that the seat cushion frame side member is Y-shaped or forked, with one base leg and two fork legs. The base leg on the one hand and the fork legs on the other hand may hereby certainly have a complex cross-section and, for example, can be designed as a molded part, pressed part, a formed part, or an open or closed hollow profile. The two fork legs can be used for different purposes: It is possible that a fork leg is connected to the seat height adjustment device or to the rear coupling linkage, whereby this connection can ensure, for example, a rotational degree of freedom about a transverse axis. The fork leg then serves to transmit a seat height retention force and/or seat height adjustment force of the seat height adjustment device, or of the coupling linkage, to the seat cushion frame side member, or to support it at the seat cushion frame side member. In this instance, the other fork leg is connected to the backrest inclination adjustment device, wherein it is possible that this fork arm bears gear elements of the backrest inclination adjustment device, or that the latter is connected thereto. In this instance, the other fork leg serves to transmit a backrest inclination retention force and/or a backrest inclination adjustment force to the seat cushion frame side member, or to support it thereon. For this embodiment of the invention, the seat cushion frame side member is thus used in a multifunctional manner since, with the two fork legs, it serves on the one hand for ensuring the seat height and on the other hand for ensuring the backrest inclination.

The backrest frame side member is preferably arranged between the two fork legs of the seat cushion frame side member, so that the fork legs partially encompass the backrest frame side member from the front side in a fork-like manner. The fork legs can hereby be formed offset in such a way that the end regions facing away from the base leg are oriented parallel to one another, or can form bearing lugs oriented parallel to one another. Within the scope of the invention, the fork legs can in each instance have a bearing lug, wherein it is additionally possible that the backrest frame side member has a bearing lug. The bearing lug of an inner fork leg thereby serves in particular for the connection with the connecting tube, while the bearing lug of the other fork arm and the bearing lug of the backrest frame side member serve, in particular, for accommodating the components and the connection to the components of the backrest inclination adjustment device. While it is possible in principle that the bearing lug axes of the bearing lugs of the fork legs are oriented coaxial to one another, these are preferably arranged with an offset from one another, from which the advantages previously explained for the offset can result.

The invention also proposes that the adjustment gear of the backrest inclination adjustment device or a gearing part thereof is accommodated "sandwich-like" between a fork leg (arranged inside and/or outside) and the backrest frame side member, wherein a guidance through the associated bearing lugs can take place. It is possible that the gearing elements of the adjustment gearing or of the gearing part are captured and/or guided in the transverse direction between the fork arm and the backrest frame side member, and/or that these are received in the bearing lugs and fixed or rotatably borne. Depending on the applied adjustment torque, a gearing element of the adjustment gearing is then coupled to the associated fork leg of the seat cushion frame side member and supported thereon, while another gearing element can be supported on the backrest frame side member. An actuation torque generated electrically or manually is converted by means of the adjustment gearing into an adjustment torque which acts between the fork arm and the backrest frame side member and can bring about the desired adjustment of the inclination angle.

There are many possibilities within the scope of the invention for the structural design of the seat cushion frame side member and, in particular, the design of the base leg on the one hand and of the fork legs on the other hand. For one proposal of the invention, the base leg and one fork leg, in particular the laterally inner fork leg, form a one-piece base body. The other fork leg is then detachably mounted on, for example screwed to, the one-piece base body. This simplifies the assembly, for example, in which an assembly of the connecting tube, under the circumstances with coupling linkages already attached thereto, to the one-piece base body can initially take place. The assembly of this sub-assembly unit on the backrest frame side member then takes place, wherein the adjustment gearing can already be assembled with this assembly step, or the adjustment gearing is mounted in a subsequent assembly step in which the other fork leg is assembled on the one-piece base body. The other fork leg can thus be attached from the outside to the base body and be mounted on the base body, for example by means of fastening screws.

In principle, it is also possible that the backrest frame side members are formed in one or more pieces. For one proposal of the invention, the backrest frame side members in each instance have a bearing lug backrest part. This bearing lug backrest part has a relatively small extent in the direction of the height of the backrest when said backrest is oriented vertically, and comprises only the bearing lug and a fastening section. The backrest frame side members then also comprise a longitudinal strut backrest part. The longitudinal strut backrest part has a fastening region which can be mounted releasably, in particular via fastening screws, with the fastening region of the bearing lug backrest part. Furthermore, the longitudinal strut backrest part has a longer section which extends along the backrest in the direction of the upper end thereof. It is thereby possible that the longitudinal strut backrest unit is insertable with its fastening region, with a precise fit, into the fastening region of the bearing lug backrest part, wherein a connection created in this way can then be secured via fastening screws. For this embodiment, the bearing lug backrest parts are connected to one another via at least one connecting strut.

Advantageous developments of the invention result from the claims, the description, and the drawings.

The advantages of features and combinations of several features as mentioned in the description are merely exemplary, and can take effect alternatively or cumulatively without the advantages necessarily needing to be achieved by embodiments according to the invention.

With regard to the disclosure content—not the scope of protection—of the original application documents and of the patent, the following applies: Further features are to be learned from the drawings—in particular the illustrated geometries and the relative dimensions of several components in relation to one another, and also their relative arrangement and operative connection. The combination of features of different embodiments of the invention, or of features of different claims, is likewise possible while deviating from the selected back-references of the claims, and is herewith encouraged. This also applies to those features which are presented in separate drawings or are mentioned in their description. These features can also be combined with features of different claims. Likewise, features listed in the claims for further embodiments of the invention can be omitted, but this does not apply to the independent claims of the granted patent.

The features mentioned in the claims and the description are to be understood, with respect to their number, such that exactly this number or a greater number than the cited number is present, without an explicit use of the adverb "at least" being required. For example, if an element is being discussed, this is to be understood to mean that precisely one element, two elements, or more elements are present. The features cited in the claims can be supplemented by further features, or can be the only features which the subject matter of the respective claim has.

The reference signs contained in the claims do not constitute a limitation of the scope of the subject matter protected by the claims. They merely serve the purpose of making the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
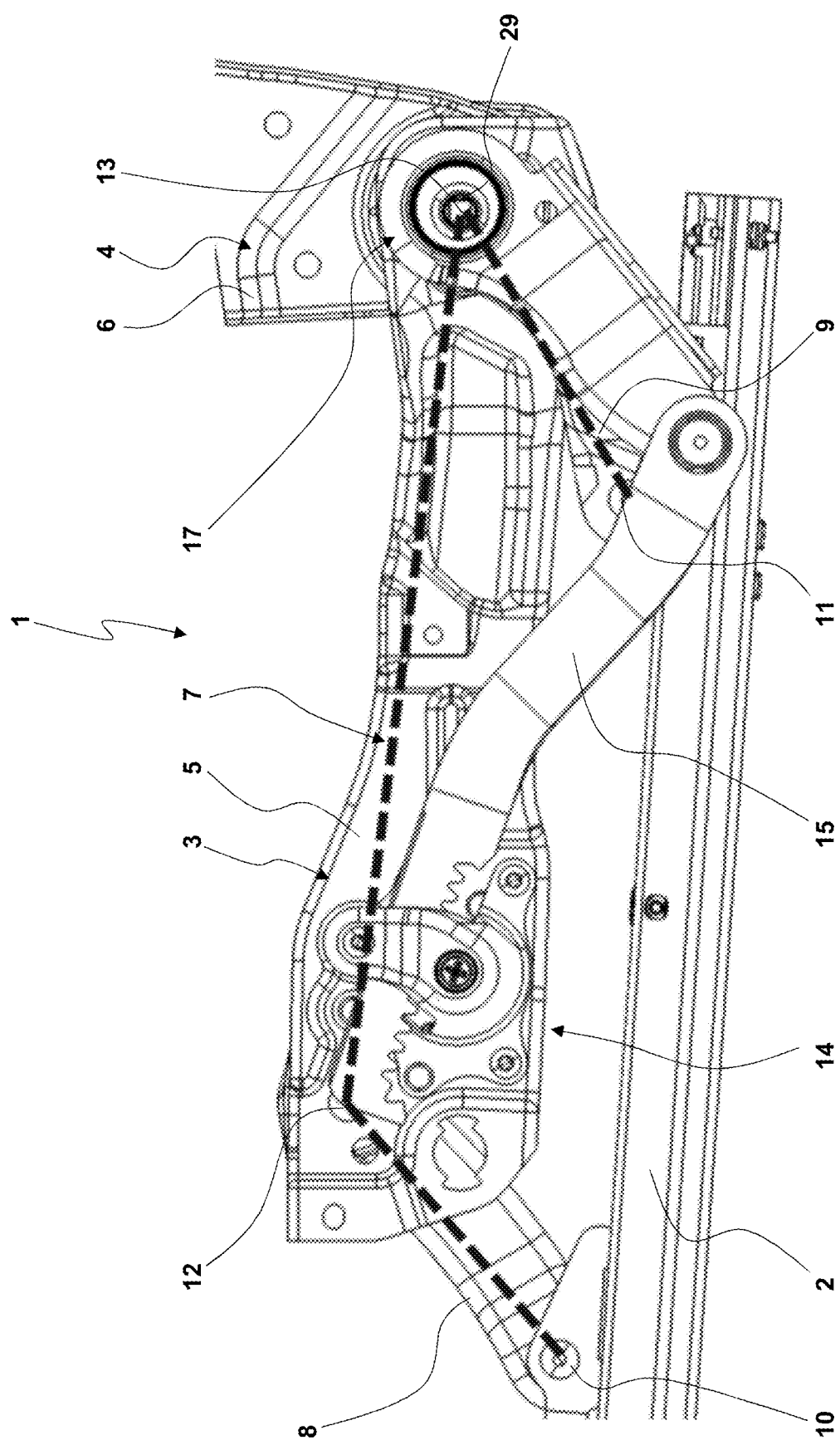
FIG. 1 shows, in a simplified side view, a partial section of a support structure of a motor vehicle seat.

FIG. 1 shows a detail of a motor vehicle seat 1 with its mechanical support and frame structure. The motor vehicle seat 1 is supported via a longitudinal rail 2 on the floor of the vehicle, wherein the motor vehicle seat 1 can be displaced along the longitudinal rail 2 via a mechanism, not explained in more detail here, and can be fixed in different positions. The motor vehicle seat 1 has a seat cushion frame 3 and a backrest frame 4. The seat cushion frame 3 carries a seat cushion, while the backrest frame 4 carries a backrest cushion. The seat cushion frame 3 has two parallel seat cushion frame side members 5, while the backrest frame 4 has two parallel backrest frame side members 6. The frame side members 5, 6 can thereby be an integral component of further parts of the frame 3, 4, or be materially bonded to other components, in particular via welding or gluing, or be otherwise connected, in particular by screwing, riveting, and the like. The frame side members 4, 5 can themselves be formed in one or more parts, wherein individual sections can also be connected to one another by welding or other joining methods. The frame side members 5, 6 are preferably produced in a plastic shaping process, in particular a forming or pressing process or deep-drawing process.

The seat cushion frame 3 is supported on the longitudinal rail 2 on both lateral sides via a four-element linkage 7. The four-element linkage 7 has a front coupling linkage 8 and a rear coupling linkage 9. The coupling linkages 8, 9 are in each instance articulated at a lower end region via a pivot bearing 10, 11 on a bearing block guided displaceably and fixably on the longitudinal rail 2. At the upper end regions, the coupling linkages 8, 9 are in each instance articulated at the seat cushion frame side member 5 via a pivot bearing 12, 13. In FIG. 1, the four-element linkage 7 formed in this way is shown schematically with dashed lines.

The motor vehicle seat 1 has a seat height adjustment device 14 of a basically known design. For the illustrated exemplary embodiment, a toothed rack 15 is articulated at the longitudinal rail 2 (displaceable in the longitudinal direction with the longitudinal displacement of the motor vehicle seat 1). A pinion of a seat height adjustment drive 16 (optionally with gearing arranged in the force flow) which is held on the seat cushion frame 3, here the seat cushion frame side member 5, meshes with the toothed rack 15. It is possible that the seat height adjustment drive 16 (with a possible gearing and/or the pinion) is integrated into or is held on a then open interior of the seat cushion frame side member 5. If the seat height adjustment drive 16 moves along the toothed rack 15 due to the rotation of the pinion, an adjustment of the joint angles of the four-element linkage 7 occurs, which is accompanied by an adjustment of the height H of the motor vehicle seat 1. Depending on the kinematic design of the four-element linkage 7, an adjustment of the height H of the motor vehicle seat 1 can also be connected to a change in the inclination of the seat cushion frame 3 and of the seat cushion frame side members 5.

Furthermore, the motor vehicle seat 1 has a backrest inclination adjustment device 17 which, in the prior art, is also referred to as a "recliner". An adjustment of the inclination angle of the backrest frame 4 relative to the seat cushion frame 3 can be effected via the recliner. The backrest inclination adjustment device 17 can hereby be designed manually with an actuation element such as an actuation wheel or an actuation lever to which the person sitting on the motor vehicle seat 1 can apply actuating forces, which are then converted, via a gearing of the backrest inclination adjustment device 17, into an adjustment torque for adjusting the backrest inclination. It is likewise possible that the backrest inclination adjustment device 17 is actuated by an electric motor.

In principle, any such devices known per se from the prior art can be used for the seat height adjustment device 14 and the backrest inclination adjustment device 17. Without a limitation to these embodiments taking place, the seat height adjustment device 14 can also not act on the seat cushion frame side member 5, as is so for the illustrated exemplary embodiment; rather, a generation of an adjustment torque can take place by means of a tooth engagement at a peripheral toothing of the coupling linkages 8 or 9. The seat height adjustment device 14 can also be designed to be manual, as is known from the prior art. Further examples, which do not limit the invention, of the design of the backrest inclination adjustment device 17 can be learned, for example from utility models DE 20 2020 107 166 U1 and DE 10 2020 122 541 A1 and the prior art cited therein. With regard to the design of the backrest inclination adjustment device 17 and a gearing contained therein, or of the recliner, reference is made to the publications CN 215 097 153 U, DE 10 2020 114 396 A1, DE 20 2022 103 376 U1 and to the not previously published patent applications DE 10 2022 103 377.5 and DE 10 2022 103 378.3, without limitation to these exemplary embodiments. As can also be learned from the publications explained above, the seat height adjustment device 14 can have an unlocking device for the backrest in order to enable a manual pivoting of the backrest forward, for example in order to enable passengers to enter the rear space of the motor vehicle through a front door of the motor vehicle. It is also possible that an automatic unlocking of a longitudinal locking device for the movement of the motor vehicle seat 1 along the longitudinal rail 2 is integrated into the backrest inclination adjustment device 17. In this way, what is known as an "easy-entry function" can be ensured.

Any additional units can be integrated into the seat cushion frame 3 and the backrest frame 4, for example a heating device, a ventilation device, a massage device and the like.

Figure 2:
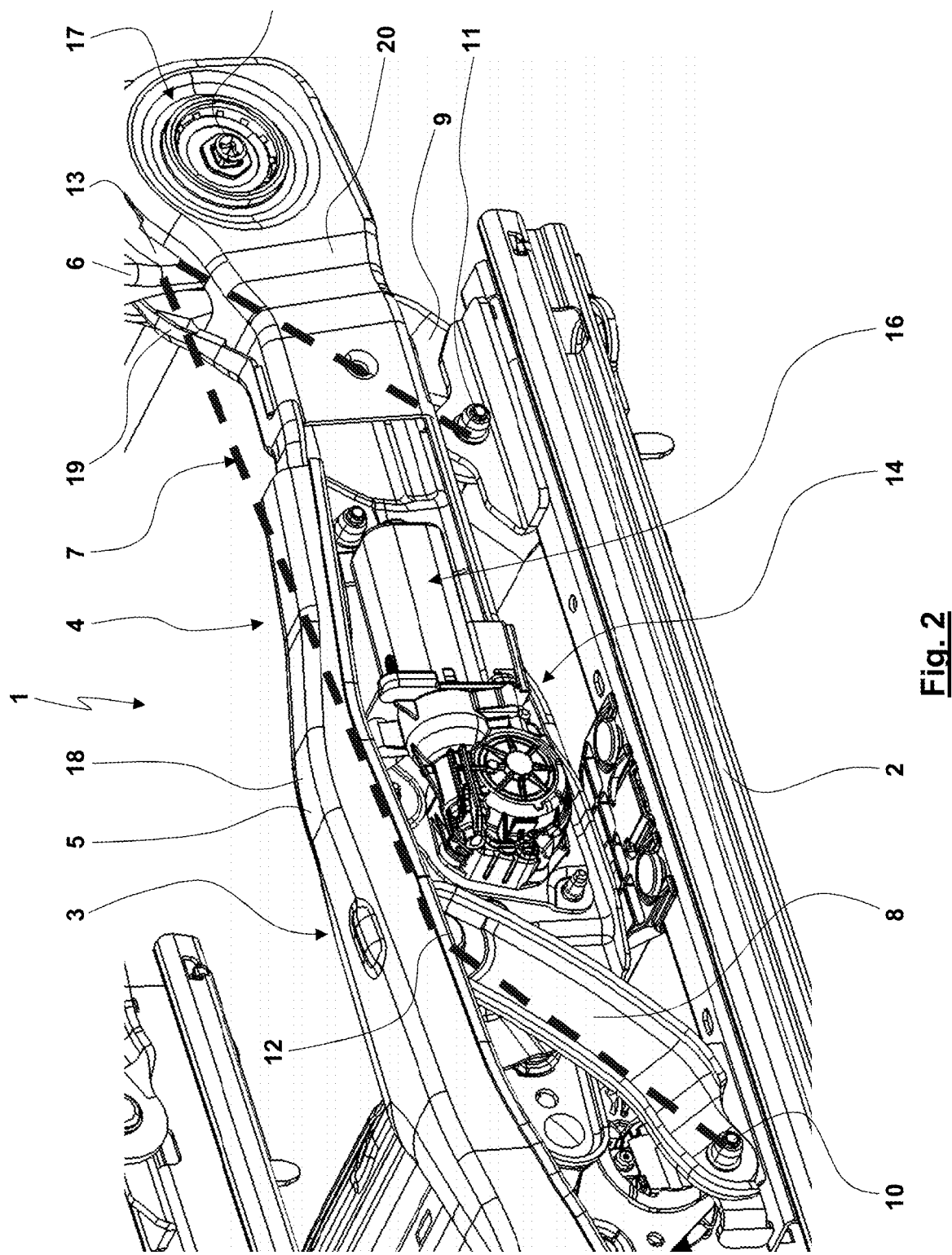
FIG. 2 shows the motor vehicle seat according to FIG. 1 in a spatial detail view, obliquely from the front.
Figure 3:
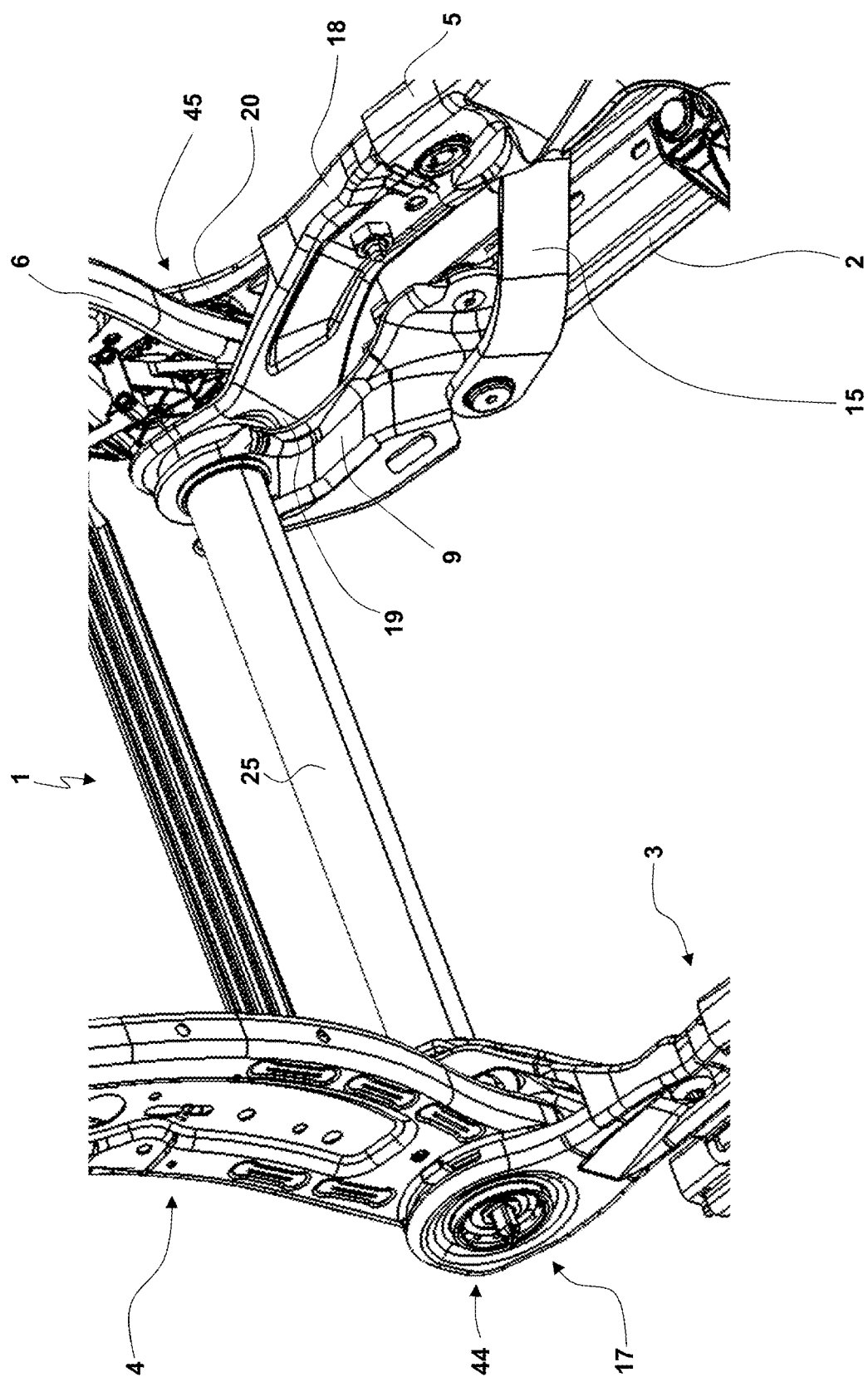
FIGS. 3 and 4 show, in different spatial views, details of the motor vehicle seat according to FIGS. 1 and 2.
Figure 4:
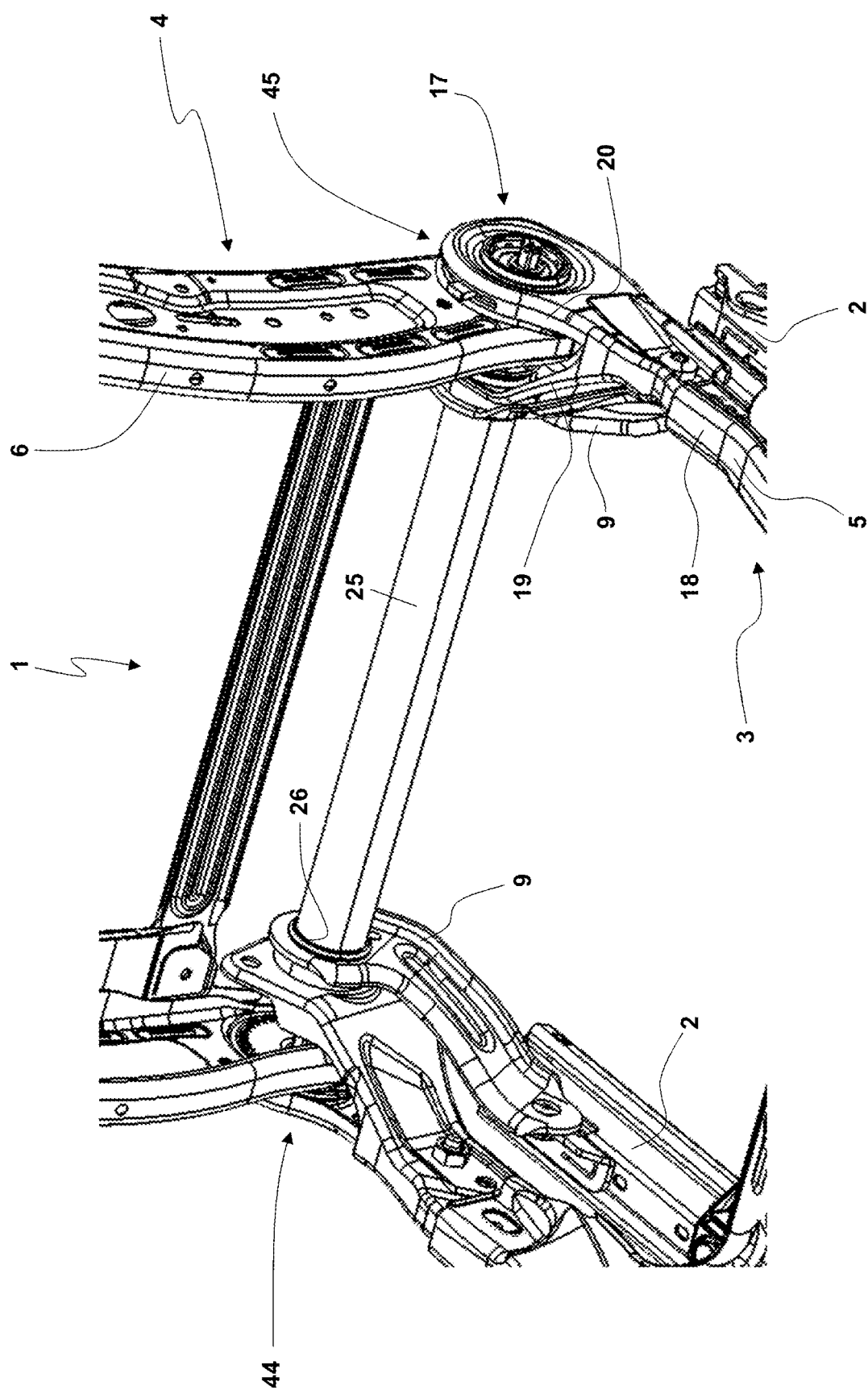
Figure 5:
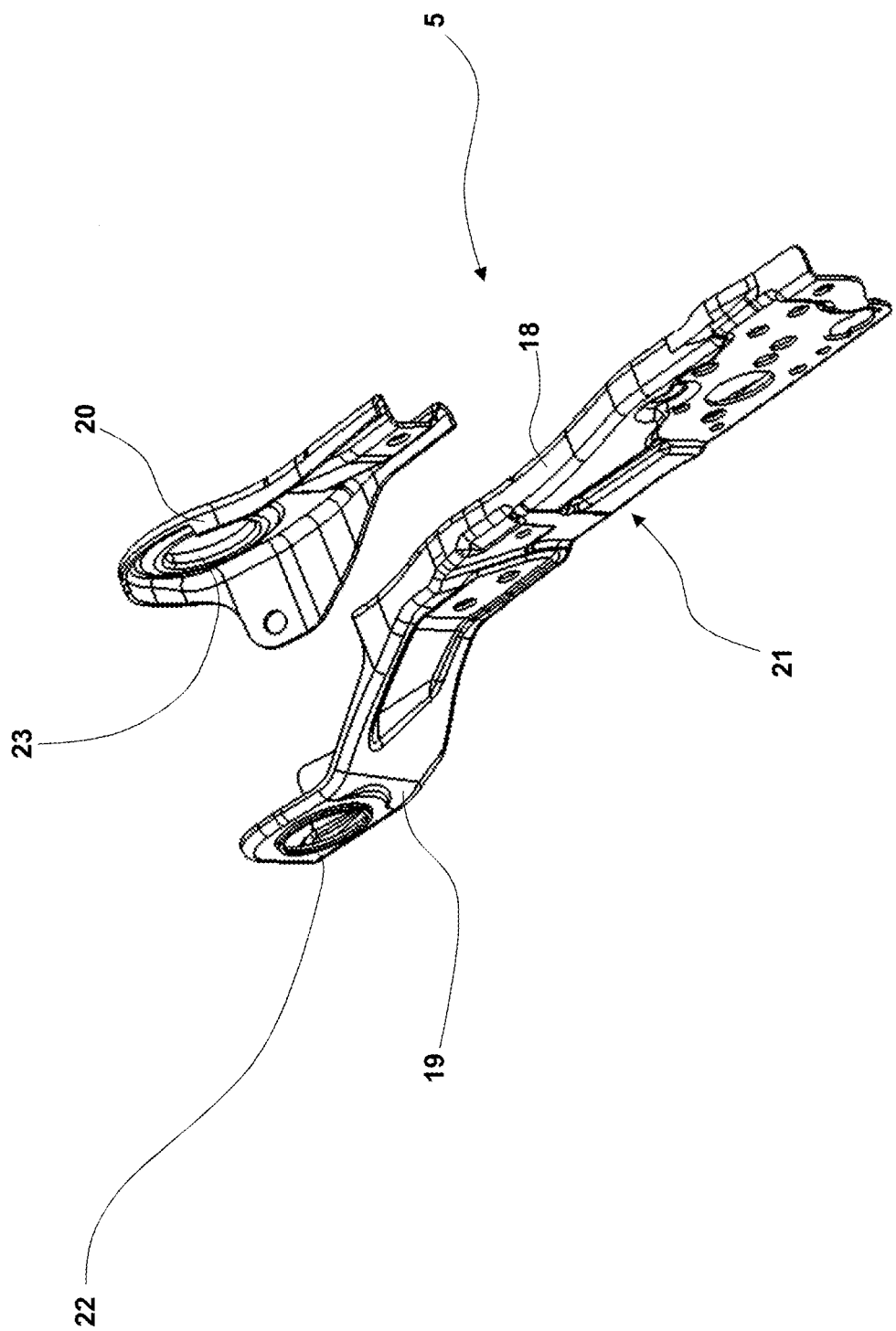
FIG. 5 shows, in a spatial view, a seat cushion frame side member of a motor vehicle seat according to FIGS. 1 to 4, wherein the seat cushion frame side member is formed with a base body, which forms a base leg and a fork leg, as well as another fork leg that can be assembled together with it.

As is apparent in FIGS. 2 to 4 and in particular in FIG. 5, in a vertical view from above the seat cushion frame side member 5 is Y-shaped or forked in the rear end region, with a base leg 18 of the fork or of the Y as well as two fork legs 19, 20 branching off from the base leg 18. It is possible (in a deviation from a classic "Y" or fork) that the fork leg 20, which is laterally outside the motor vehicle seat 1, forms a smaller angle relative to the base leg 18, or even represents an extension of the same (see FIG. 5). It can be seen, from the exploded view according to FIG. 5, that the laterally inner fork leg 19 and the base leg 20 are formed integrally as a base body 21, on which the fork leg 20 can then be assembled, in particular by screwing. The components forming the base leg 18 and the fork legs 19, 20 are preferably designed as open or closed box profiles.

The fork legs 19, 20 in each instance have a bearing lug 22, 23. The fork legs 19, 20 are thereby designed so as to be offset in such a way that the bearing lugs 22, 23 are arranged in parallel planes. While it is basically also possible in principle that the bearing lug axes 33, 31 of the bearing lugs 22, 23 are arranged coaxial to one another, for the illustrated exemplary embodiment the bearing lug axes 33, 31 of the bearing lugs 22, 23 have an offset 34 in the event of parallel orientation, which will be explained below. The bearing lugs 22, 23 serve to accommodate and rotatably bear components of the backrest inclination adjustment device 17 and of the pivotable bearing of the backrest frame 4 relative to the seat cushion frame 3, depending on the actuation of the backrest inclination adjustment device 17.

As can be seen in FIG. 4, for example, the backrest frame side member 6 is arranged between the fork legs 19, 20. The backrest frame side member 6 hereby likewise has a bearing lug 24. For the illustrated exemplary embodiment, the bearing lug axis 32 of the bearing lug 24 of the backrest frame side member 6 is thereby arranged coaxial to the bearing lug axis 31 of the bearing lug 23 of the fork arm 20.

A connecting tube 25 is rotatably borne in the bearing lug 22 in such a way that only one rotational degree of freedom of the connecting tube 25 in relation to the seat cushion frame side member 5 results. The connecting tube 25 serves to connect the seat cushion frame side members 5, arranged on both lateral sides, in the rear end region in order to form the seat cushion frame 3.

Figure 6:
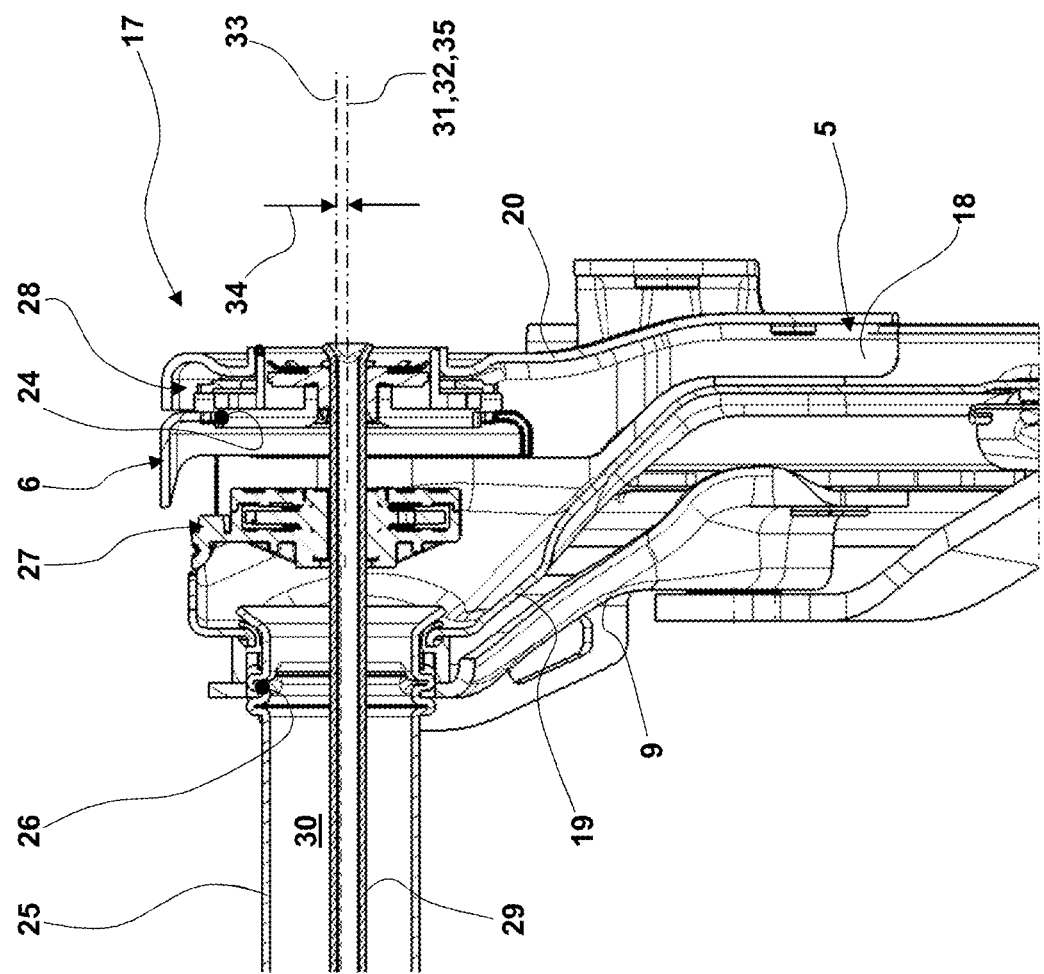
FIG. 6 shows, in a sectional view from above, a detail of a motor vehicle seat according to FIGS. 1 to 5 in the region of a backrest inclination adjustment device.

As is visible in particular in FIG. 6, an end region of the rear coupling linkage 9 is provided with a bearing lug 26. In the region of the bearing lug 26, the coupling linkage 9 is connected in a rotationally fixed manner to the connecting tube 25, which is ensured by a forming process of the connecting tube 25 in such a way that the bulges discernible in FIG. 6 interact positively and/or frictionally with the bearing lug 26 in such a way that there exists a fastening between the connecting tube 25 and the coupling linkage 9, without any remaining degree of freedom.

For the illustrated exemplary embodiment, the connecting tube 25 is connected in a rotationally fixed manner to the rear coupling linkage 9, while a rotatable bearing of the connecting tube 25 relative to the seat cushion frame side member 5 is effected. Alternatively, an embodiment is also possible in which the coupling linkage 9 is rotatably borne on the connecting tube 25, while a rotationally fixed connection of the connecting tube 25 to the bearing lug 19 of the seat cushion frame side member 5 is effected.

It can also be seen in FIG. 6 that a first gearing part 27 of the backrest inclination adjustment device 17 is integrated into the interior of the bearing lug 20 and/or is arranged or caught or received between the fork arm 20 and the backrest frame side member 6, while a second gearing part 28 of the backrest inclination adjustment device 17 which interacts with the first gearing part 27 can be captured, arranged, or received between the fork arm 19 and the backrest frame side member 6.

It can also be seen in FIG. 6 that a coupling rod 29 is present. The coupling rod 29 mechanically couples, while transmitting a coupling torque, the backrest inclination adjustment units 44, 45 of the backrest adjustment device 17 on both lateral sides of the motor vehicle seat 1 with one another, in such a way that, on the one hand, a uniform adjustment of the inclination is effected on both sides and, on the other hand, a support of a load acting on the backrest is also ensured by means of the two backrest inclination adjustment units 44, 45 when these are locked. The coupling rod 29 thereby extends through an interior 30 of the connecting tube 25, through the bearing lug 26, the bearing lug 22 of the fork leg 19, the bearing lug 24 of the backrest frame side member 6, and the bearing lug 23 of the fork leg 20, wherein the coupling rod 29 can also extend at least partially or, as shown here, completely through the gearing parts 27, 28 of the backrest inclination adjustment device 17.

In the view according to FIG. 6 it can be seen that, in a projection onto a horizontal plane, the longitudinal axis of the coupling rod 29 is displaced forward with an offset component relative to the longitudinal axis of the connecting tube 25, this offset component being in particular 5% to 50% or 5% to 40% or 10% to 30% of the radius of the interior 30 of the connecting tube 25, insofar as the connecting tube 25 has a circular cross-section. It is also possible that, in a projection onto a vertical plane, an offset component of the coupling rod 29 takes place downward relative to the longitudinal axis of the connecting tube 25, wherein in this instance the offset component can be 5% to 50%, or 5% to 40%, or 10% to 30% of the radius of the interior 30 of the connecting tube 25 if the connecting tube 25 has a circular cross-section.

Shown in FIG. 6 are on the one hand the bearing lug axes 31, 32 of the bearing lug 24 of the backrest frame side member 6 and of the bearing lug 23 of the fork arm 20, and on the other hand the bearing lug axis 33 of the bearing lug 22 of the fork arm 11, which have an offset 34. The bearing lug axes 31, 32 can thereby correspond to the adjustment axis 35 of the backrest inclination adjustment device 17, and/or to the adjustment axis about which the backrest is pivoted during the change of the inclination of said backrest. The offset 34 is thereby, inter alia, composed of a vertical offset component and a horizontal offset component.

In particular in FIGS. 7, 8, 9, 10, it can be seen that the backrest frame side members 6 are formed in two parts, with a bearing lug backrest part 36 which forms the bearing lug 24, and a longitudinal strut backrest part 37 which extends over a large part of the side of the backrest and extends in particular up to the upper end region of the backrest frame 4. The bearing lug backrest part 36 and the longitudinal strut backrest part 37 are inserted into one another in a precise fit and screwed together via fastening screws 38. The right-hand and left-hand bearing lug backrest parts 36 are connected to one another via at least one connecting strut 39a, 39b, which are screwed, welded, caulked, or otherwise firmly connected to the bearing lug backrest parts 36. In contrast, a connection of the longitudinal strut parts 37 takes place indirectly in the lower end region via the connecting strut 39 of the bearing lug backrest parts 36, without additional, direct connecting struts 39 being provided on the longitudinal strut parts 37 in the lower end region. In contrast, in the central or upper end region of the seat cushion frame 3, at least one connecting strut oriented in the transverse direction can be fastened to the longitudinal strut backrest parts 37.

The two-part design of the backrest frame side members 6 enables a production in a production line in which, initially, only the seat cushion frame 3 with associated components and, of the backrest frame 4, only the bearing lug backrest parts 36 with the connecting strut 39 are arranged. The further units can then be assembled on this sub-assembly unit. In particular, the assembly can take place with the seat height adjustment device 14 and/or the backrest inclination adjustment device 17, since all components which are part of the backrest inclination adjustment device 17 or are connected thereto can be present on the bearing lug backrest part 36 or can be assembled thereon. The upper part of the backrest can then be assembled only in a later assembly step. In particular, in the later assembly step, an insertion of the longitudinal struts of the backrest 37 into the bearing lug backrest parts 36 and then the fastening by means of the fastening screws 38 can then take place.

Figure 7:
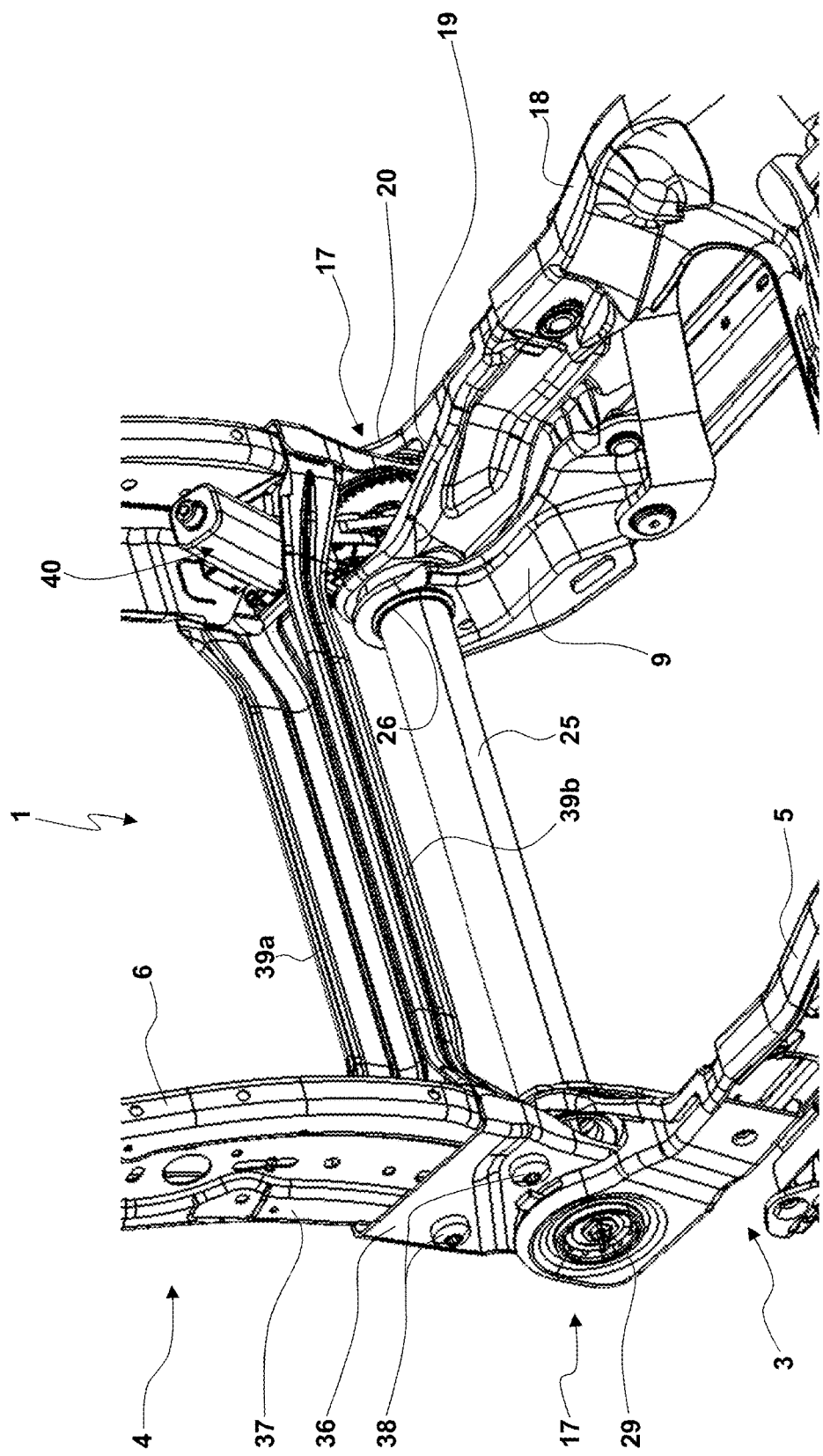
FIGS. 7 to 10 show a further embodiment of a motor vehicle seat in different detailed spatial views.
Figure 8:
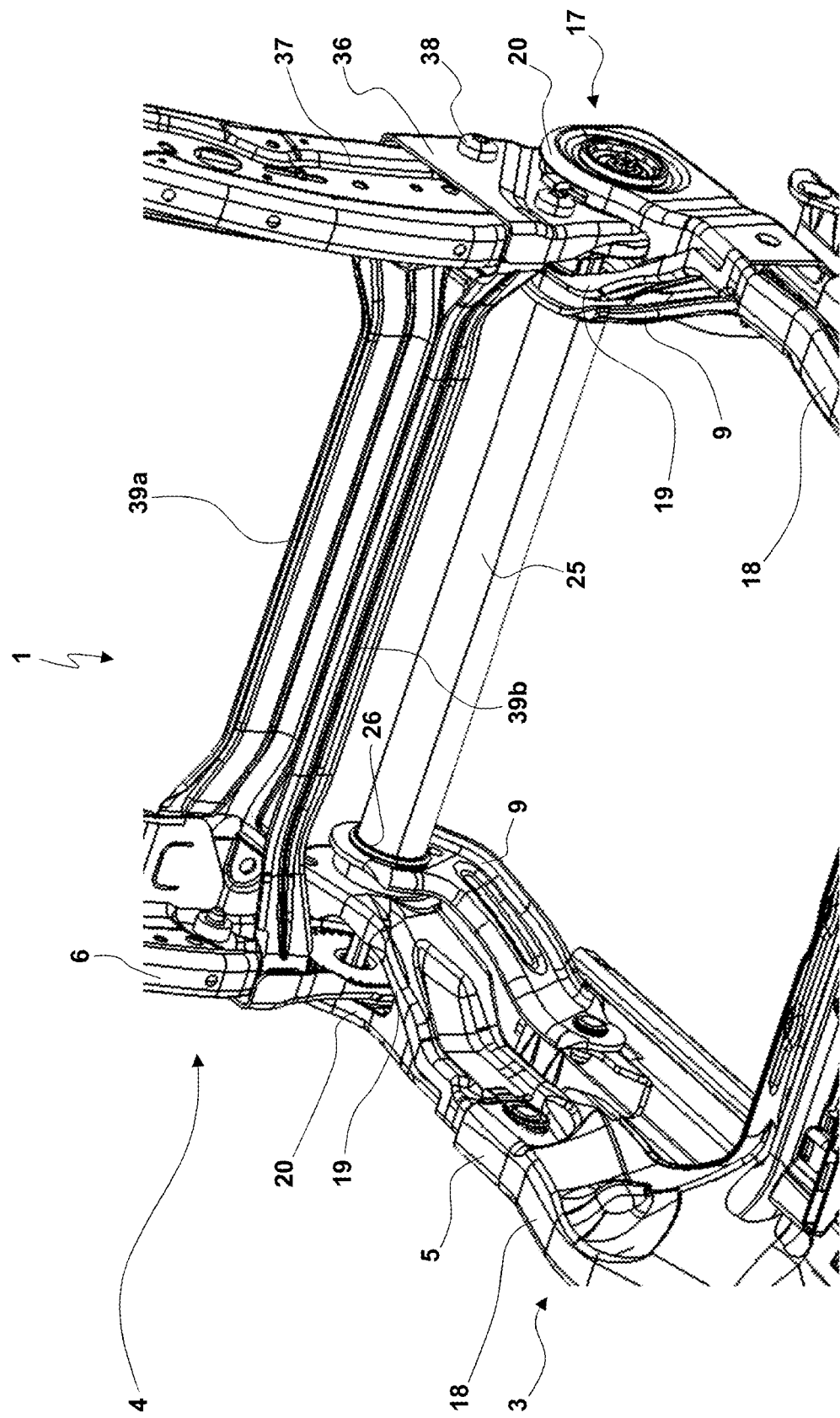
Figure 9:
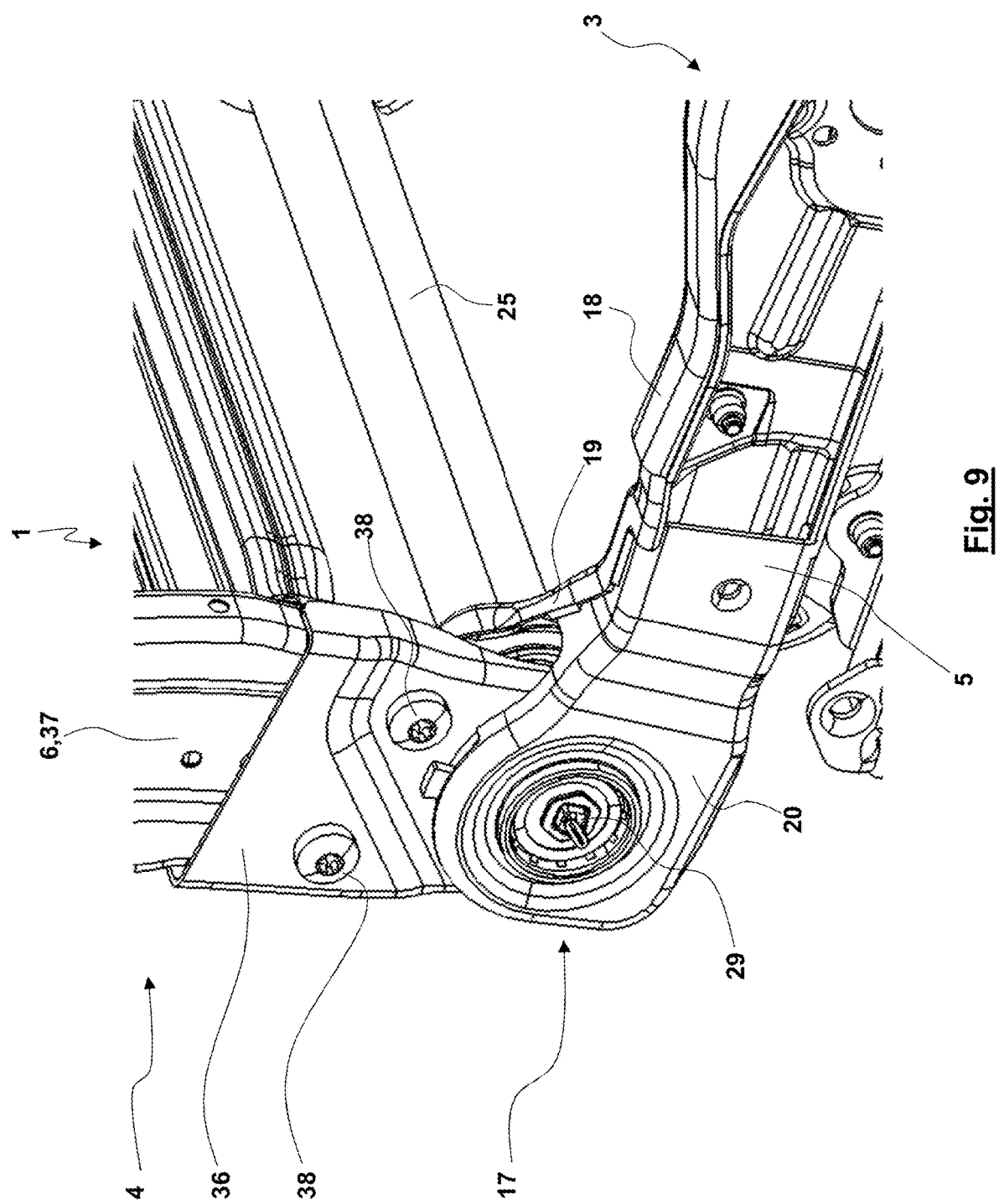
Figure 10:
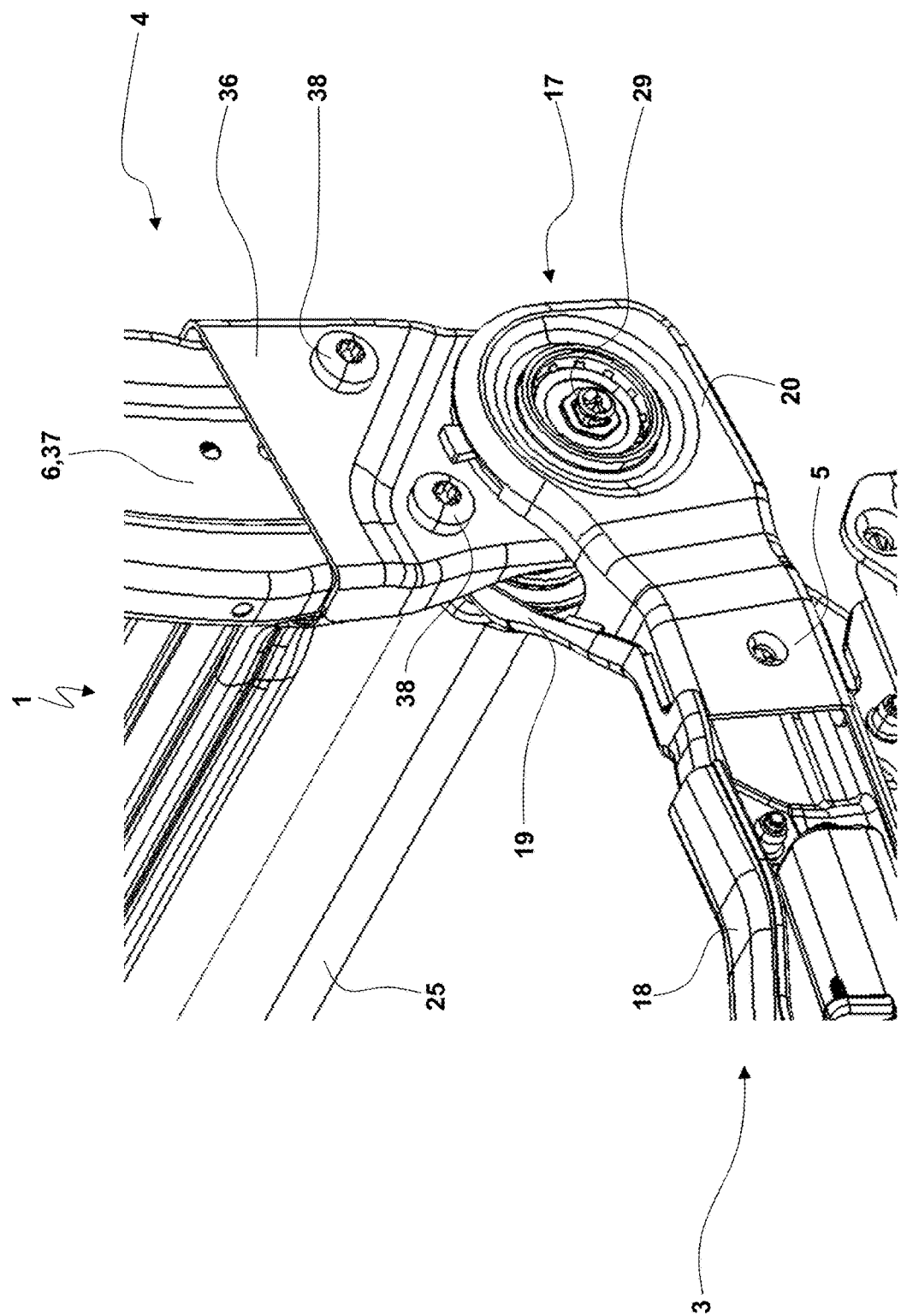

As a further detail, it can be seen in FIG. 7 that an actuation of the backrest inclination adjustment device 17 can be effected via an electric backrest inclination adjustment drive 40. The backrest inclination adjustment drive 40 can also already be assembled on the sub-assembly unit in the explained sub-assembly step, in that the longitudinal struts of the backrest members 37 have not yet been mounted, wherein, as can be seen in FIG. 7, an end region of the backrest inclination adjustment drive 40 can protrude upward out of this sub-assembly unit. With the connection of the longitudinal strut parts 37 to the bearing lug backrest part 36, the joining then takes place adjacent to the backrest inclination adjustment drive 40, wherein it is also possible that the upper end region of the backrest inclination adjustment drive 40 enters a downwardly open interior of the longitudinal strut backrest part 37.

Figure 11:
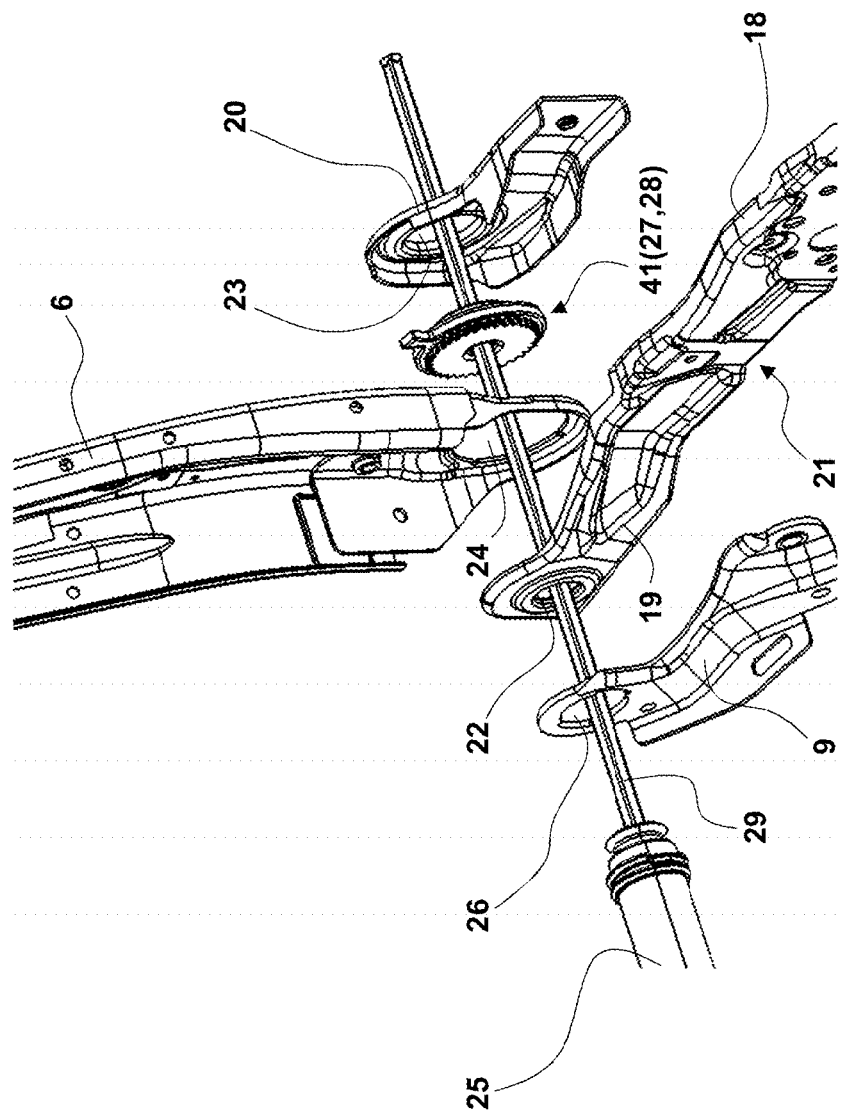
FIG. 11 shows a connecting tube, a rear coupling linkage, a base body of a seat cushion frame side member, a backrest frame side member, an adjustment gearing, and a fork leg of the seat cushion frame side member, as well as a coupling rod, in an exploded spatial view.

In the exploded illustration according to FIG. 11, it can be seen that the backrest inclination adjustment device 17 can have an adjustment gearing 41. It is hereby possible that the adjustment gearing 41 has gearing parts 27, 28. For the exemplary embodiment illustrated in FIG. 11, the adjustment gearing 41 or at least one gearing part 27, 28 thereof is assembled between the base leg 20 of the seat cushion frame side member 5 and the backrest frame side member 6, in particular the bearing lug backrest part 36, wherein the bearing lugs 23, 24 can serve for the rotational guidance of a gearing element or gearwheel of the adjustment gearing 41.

Figure 12:
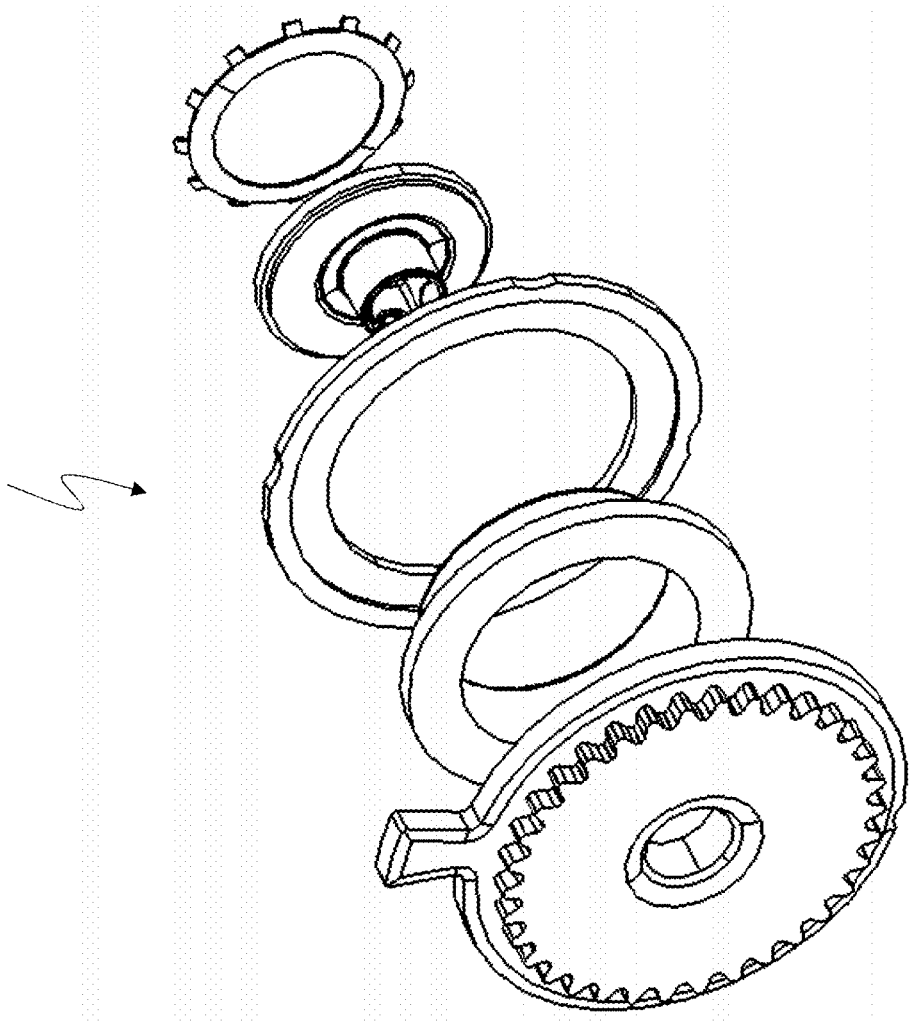
FIG. 12 shows, in a spatial, highly schematic view, an adjustment gearing of a backrest inclination adjustment device.

The adjustment gearing 41 with its different components is shown highly simplified (without illustration of the individual tooth connections) in FIG. 12.

Figure 13:
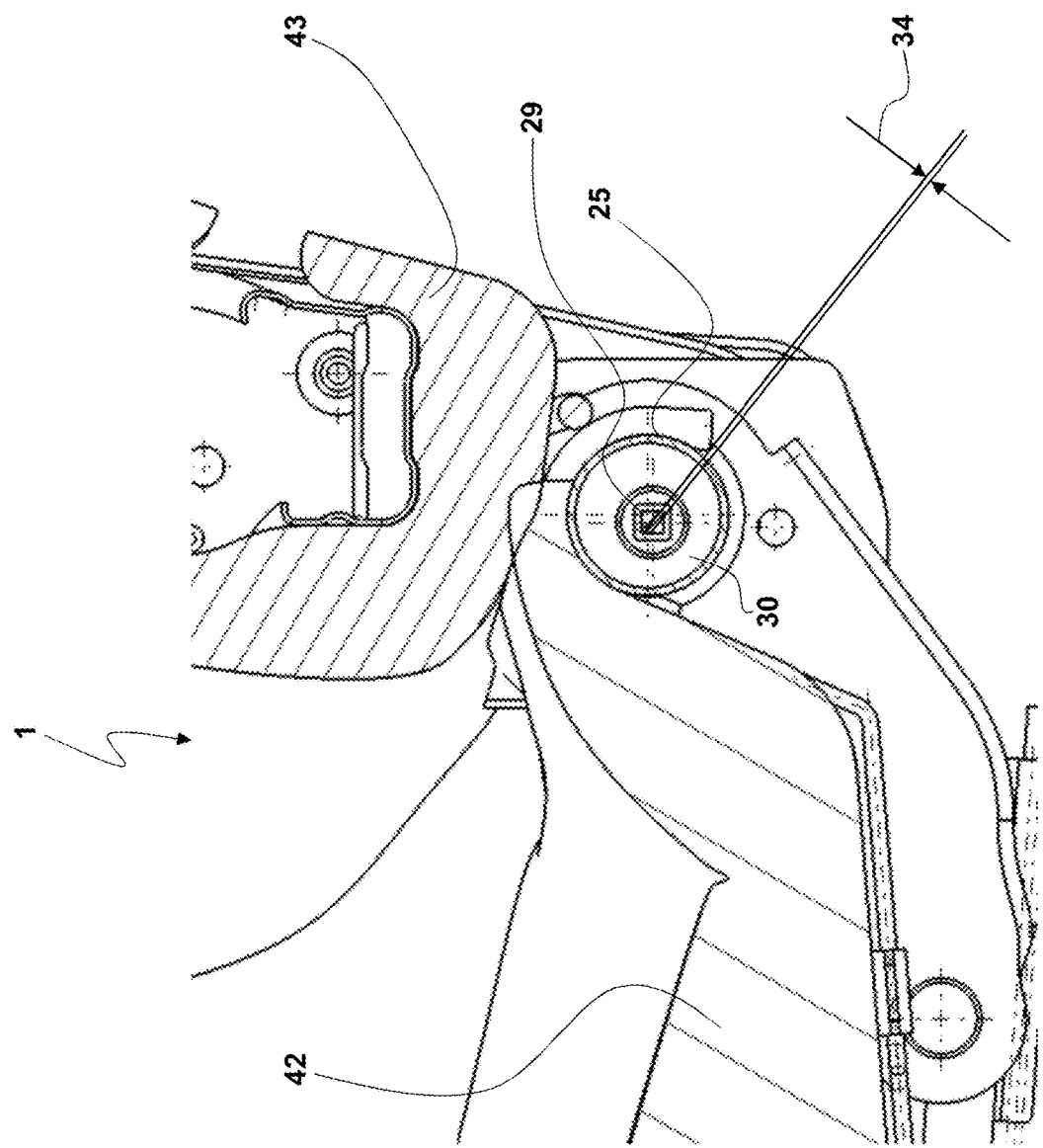
FIG. 13 schematically shows, in a side view, the motor vehicle seat with the seat cushion and the backrest cushion, with an inclination of the backrest which is suitable for sitting.

FIG. 13 shows the motor vehicle seat 1 with the seat cushion 42 held by the seat cushion frame 3, and the backrest cushion 43 held by the backrest frame 4.

An offset 34 can also be seen here between the bearing lug axes 31, 32, and thus the adjustment axis 35, on the one hand and the bearing lug axis 33 on the other hand. In this instance, the offset 34 has both an offset component in the horizontal direction forward and an offset component of approximately the same magnitude downward in the vertical direction.

Figure 14:
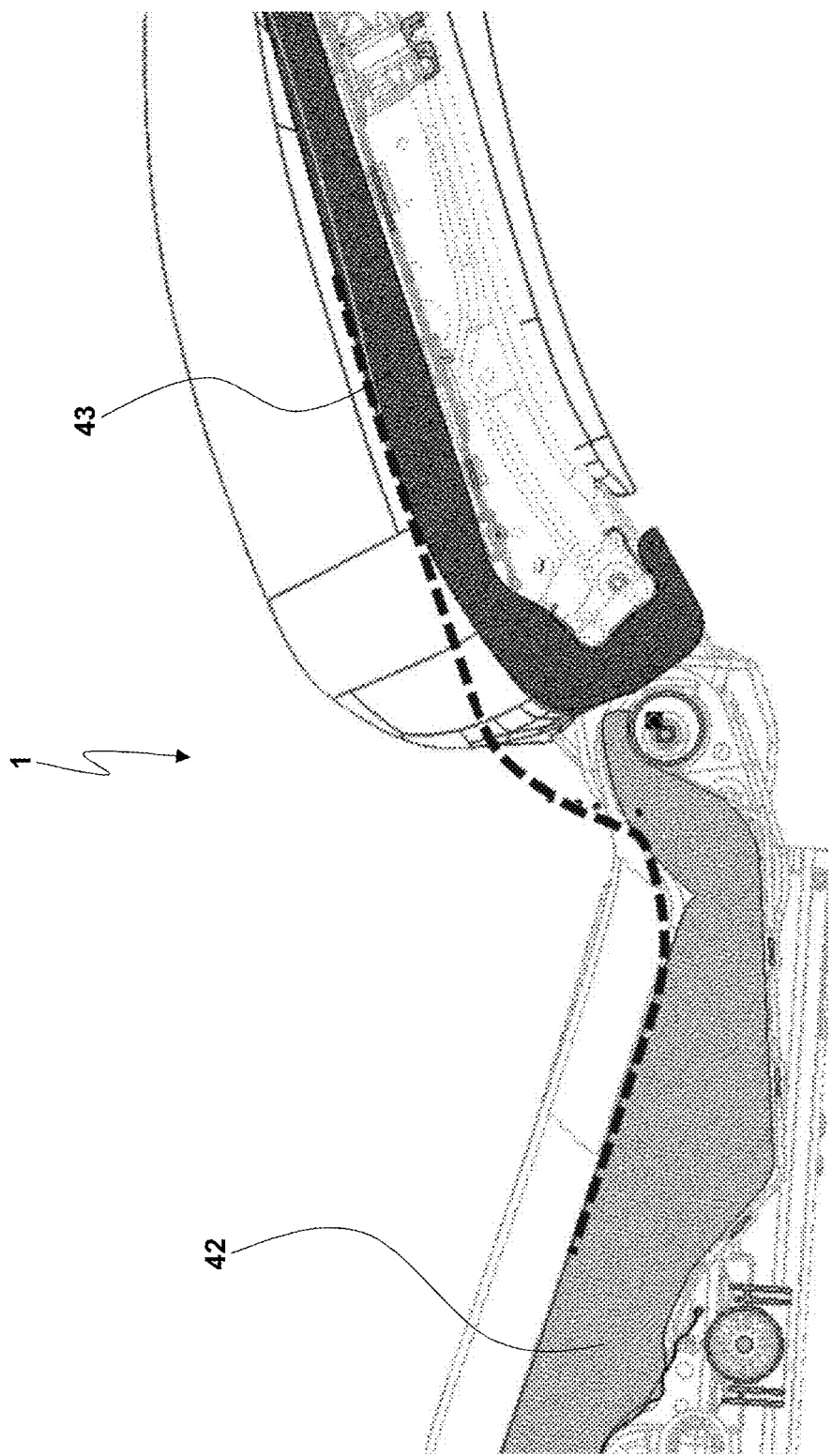
FIG. 14 shows the motor vehicle seat according to FIG. 13 with the seat cushion and the backrest cushion, in a reclining position.

FIG. 14 shows the motor vehicle seat 1 for an inclination of the backrest into a reclining position. It can be seen here that, via the design according to the invention and the previously explained selection of the offset 34, a flattening of the support surface for the person reclining on the motor vehicle seat 1 results.

Many variations and modifications may be made to the preferred embodiments of the invention without departing substantially from the spirit and principles of the invention. All such modifications and variations are intended to be included herein within the scope of the present invention, as defined by the following claims.

I claim:

1. A motor vehicle seat comprising
   a) a seat cushion frame that has seat cushion frame side members and is supported at a height H relative to a floor by means of a four-element linkage with front and rear coupling linkages,
   b) a back rest frame which has backrest frame side members,
   c) a seat height adjustment device for changing the height H of the seat cushion frame,
   d) a backrest inclination adjustment device for changing the inclination of the backrest frame in relation to the seat cushion frame about an adjustment axis, and
   e) a connecting tube which connects the two seat cushion frame side members to one another and is connected to the rear coupling linkages
   wherein
   f) the adjustment axis runs through the cross-section of the connecting tube, and wherein the adjustment axis extends with an offset through the connecting tube.

2. The motor vehicle seat according to claim 1, wherein
   a) the backrest inclination adjustment device has a right-hand backrest inclination adjustment unit and a left-hand backrest inclination adjustment unit which are coupled to one another via a coupling rod, and
   b) the coupling rod extends through the connecting tube.

3. The motor vehicle seat according to claim 2, wherein the coupling rod extends with an offset through the connecting tube.

4. The motor vehicle seat according to claim 1, wherein the seat cushion frame side members are Y-shaped or forked, with a base leg and two fork legs.

5. The motor vehicle seat according to claim 4, wherein
   a) a fork leg is connected to the seat height adjustment device or to the rear coupling linkage, so that a seat height retention force and/or seat height adjustment force of the seat height adjustment device or coupling linkage is transmitted via the fork leg to a seat cushion frame side member and/or is supported on a seat cushion frame side member, and
   b) the other fork leg is connected to the backrest inclination adjustment device so that a backrest inclination retention force and/or backrest inclination adjustment force is transmitted via the other fork leg to a seat cushion frame side member and/or is supported on a seat cushion frame side member.

6. The motor vehicle seat according to claim 4, wherein the backrest frame side members are arranged between the two fork legs.

7. The motor vehicle seat according to claim 4, wherein the fork legs in each instance have a bearing lug.

8. The motor vehicle seat according to claim 7, wherein the bearing lug axis of the bearing lugs of the fork legs are arranged with an offset relative to one another.

9. The motor vehicle seat according to claim 7, wherein between the bearing lug of the backrest frame side members and the fork leg arranged on the outside an adjustment gearing or a gearing part of the backrest inclination adjustment device is arranged.

10. The motor vehicle seat according to claim 7, wherein between the bearing lug of the back rest frame side members and the fork leg arranged on the inside an adjustment gearing or a gearing part of the backrest inclination adjustment device is arranged.

11. The motor vehicle seat according to claim 4, wherein the base leg and one fork leg form a one-piece base body, and the other fork leg is assembled on the base body.

12. The motor vehicle seat according to claim 4, wherein the backrest frame side members in each instance have a bearing lug backrest part and a longitudinal strut backrest part, wherein the bearing lug backrest parts are connected to one another via a connecting strut.

13. The motor vehicle seat according to claim 4, wherein the backrest frame side members in each instance have a bearing lug backrest part and a longitudinal strut backrest part, wherein the longitudinal strut part is assembled on the bearing lug backrest part.

14. A motor vehicle seat comprising:
   a) a seat cushion frame that has seat cushion frame side members and is supported at a height H relative to a floor by means of a four-element linkage with front and rear coupling linkages,
   b) a back rest frame which has backrest frame side members,
   c) a seat height adjustment device for changing the height H of the seat cushion frame,
   d) a backrest inclination adjustment device for changing the inclination of the backrest frame in relation to the seat cushion frame about an adjustment axis, wherein the backrest inclination adjustment device has a right-hand backrest inclination adjustment unit and a left-hand backrest inclination adjustment unit which are coupled to one another via a coupling rod, and
   e) a connecting tube which connects the two seat cushion frame side members to one another and is connected to the rear coupling linkages,
   wherein
   f) the adjustment axis and the coupling rod run through the cross-section of the connecting tube, and wherein the coupling rod extends with an offset through the connecting tube.

15. The motor vehicle seat according to claim 14, wherein the seat cushion frame side members are Y-shaped or forked, with a base leg and two fork legs.

16. A motor vehicle seat comprising:
   a) a seat cushion frame that has seat cushion frame side members and is supported at a height H relative to a floor by means of a four-element linkage with front and rear coupling linkages, the seat cushion frame side members being Y-shaped or forked, with a base leg and two fork legs, wherein each of the fork legs comprises a bearing lug and wherein a bearing lug axis of the bearing lugs of the fork legs are arranged with an offset relative to one another,
   b) a back rest frame which has backrest frame side members,
   c) a seat height adjustment device for changing the height H of the seat cushion frame,
   d) a backrest inclination adjustment device for changing the inclination of the backrest frame in relation to the seat cushion frame about an adjustment axis, and
   e) a connecting tube which connects the two seat cushion frame side members to one another and is connected to the rear coupling linkages
   wherein
   f) the adjustment axis runs through the cross-section of the connecting tube.

17. The motor vehicle seat according to claim 16, wherein
a) the backrest inclination adjustment device has a right-hand backrest inclination adjustment unit and a left-hand backrest inclination adjustment unit which are coupled to one another via a coupling rod, and
b) the coupling rod extends through the connecting tube.

18. The motor vehicle seat according to claim 16, wherein the adjustment axis extends with an offset through the connecting tube.

\* \* \* \* \*